United States Patent [19]

Carnes, Jr. et al.

[11] Patent Number: 5,880,425
[45] Date of Patent: Mar. 9, 1999

[54] METHOD AND APPARATUS FOR JOINING METALS

[75] Inventors: Robert W. Carnes, Jr.; Paul W. Haase; Robert S. Hudson; Steven P. Nichols, all of Austin, Tex.

[73] Assignee: Board of Regents, The University of Texas System, Austin, Tex.

[21] Appl. No.: 841,239

[22] Filed: Apr. 29, 1997

[51] Int. Cl.$^6$ ................................................. B23K 11/26
[52] U.S. Cl. ........................................... 219/112; 219/105
[58] Field of Search .................................. 219/112, 101, 219/102, 104, 105

[56] References Cited

U.S. PATENT DOCUMENTS

| | | | |
|---|---|---|---|
| 1,467,792 | 9/1923 | Holmes | 219/105 |
| 1,857,505 | 5/1932 | Heineman | 219/105 |
| 2,021,157 | 11/1935 | Stahl | 219/105 |
| 3,259,969 | 7/1966 | Tessman | 219/104 |
| 3,613,106 | 10/1971 | Cavagnero | 219/104 |
| 4,544,874 | 10/1985 | Weldon et al. | 322/10 |
| 4,656,328 | 4/1987 | Weldon et al. | 219/112 |
| 5,515,705 | 5/1996 | Weldon et al. | 72/19.1 |
| 5,770,832 | 6/1998 | Carnes et al. . | |

OTHER PUBLICATIONS

Anstoos and Weldon, "Homopolar Pulse Welding of High Strength Steel Line Pipe," Publication No. PN–139 Center for Electromechanics at The University of Texas at Austin, Apr. 1988, pp. 13–15.
Carnes and Hasse, "The Current State of Homopolar Pipeline Welding," Proceedings, SPE 69th Annual Technical Conference and Exhibition, New Orleans, LA, Sep. 25–28, 1995.
Grant et al., "Homopolar Pulse Resistance Welding: A New Welding Process," *Welding Journal,* May 1979.
Haase et al., "Homopolar Pulse Welding for Offshore Deep Water Pipelines," Proceedings 27th Annual Offshore Technology Conference, Houston, TX May 1–4, 1995, Dallas: Offshore Technology Conference.
Hudson et al., "Homopolar Pulse Welding for J–Lay Applications: Recent Developments," Proceedings of the Energy Week '96 Conference Book 2, Houston, TX, 221–226, 1996.
Hudson et al., "Homopolar Pulse Welding for J–Lay Applications: Recent Process Improvements," Poster Session in the 77th Annual AWS Convention and International Welding and Fabrication Exposition, Chicago, Ill., Apr. 22–25, 1996.
Keith et al., "Feasibility Study of Pipe Welding Using a Homopolar Generator," Electric Power Research Institute Research Project 1122–2 Final Report, Dec. 1979, NP–1285. pp. 11–12, (CEM RF–13).
Kieth et al., "Final Report on Resistance Welding with Homopolar Generators,"Center for Electromechanics at The University of Texas at Austin RF–19 Sep. 1980, pp. 11–12.
O'Brian, R.L., ed., 1991. Welding Handbook., vol. 2. 8th Ed. Miami: American Welding Siciety, pp. 585–590.
Pappas et al., "Homopolar Welding Developments and Economics," Proceedings of the Energy Week '96 Conference Book 2, Houstan, Texas, 1996, pp. 221–226.
Prosser, K. 1990. Alternative Welding Systems for Pipelines, Rivista Italiana Dlla Saldatura, 42:385–397.
Rylander, R.G. "Resistance Welding with Homopolar Generator," Progress Report National Science Foundation Grant No. DAR77–23874, Publication No. RO–4, Center for Electromechanics, The University of Texas at Austin, Nov. 1978.
Walters and Aanstoos, "Welding and Billet Heating With Homopolar Generators," *Metal Progress,* 25–28, Apr. 1985.
Moe et al., "Welding of 12/13 % CR Steels With Forge Welding, Mechanical and Corrosion Properties.," *Corrosion 95,* The NACE International Annual Conference and Corrosion Show, Paper No. 97 (97/1–97/16).

*Primary Examiner*—Clifford C. Shaw
*Attorney, Agent, or Firm*—Arnold, White & Durkee

[57] ABSTRACT

The present invention discloses methods and apparatus for joining of two workpieces. The present invention includes special preparation of the joining ends of the two workpieces to be joined. Methods of the present invention include delivering a high current, low voltage pulse to a pair of workpieces to be joined while applying and maintaining a constantly high load on said workpieces to thereby join the workpieces.

14 Claims, 8 Drawing Sheets

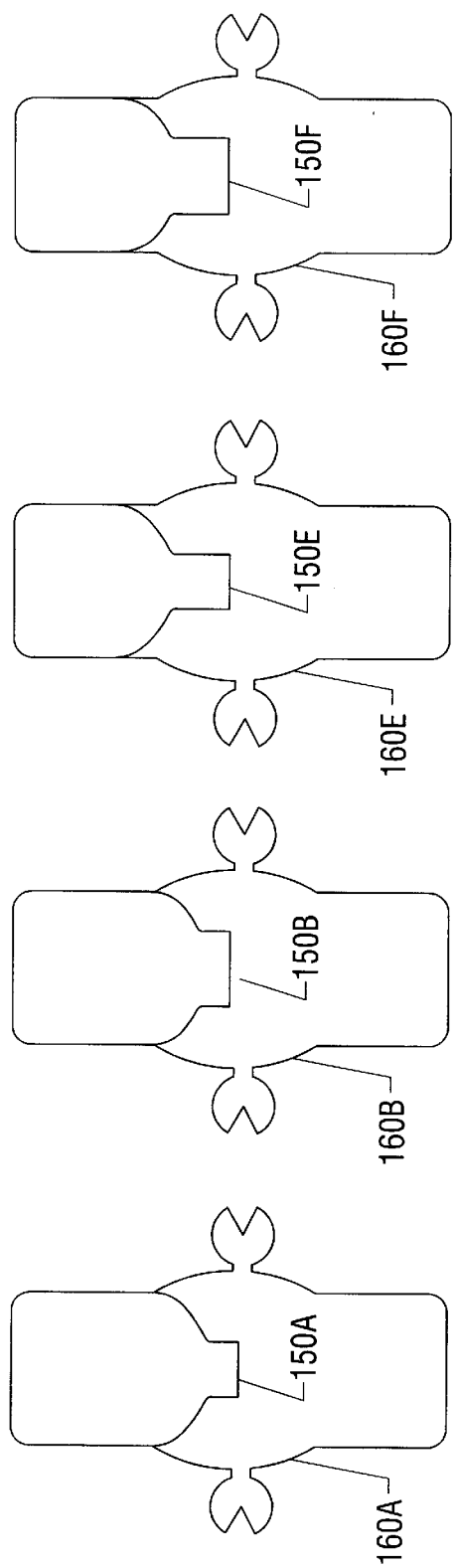
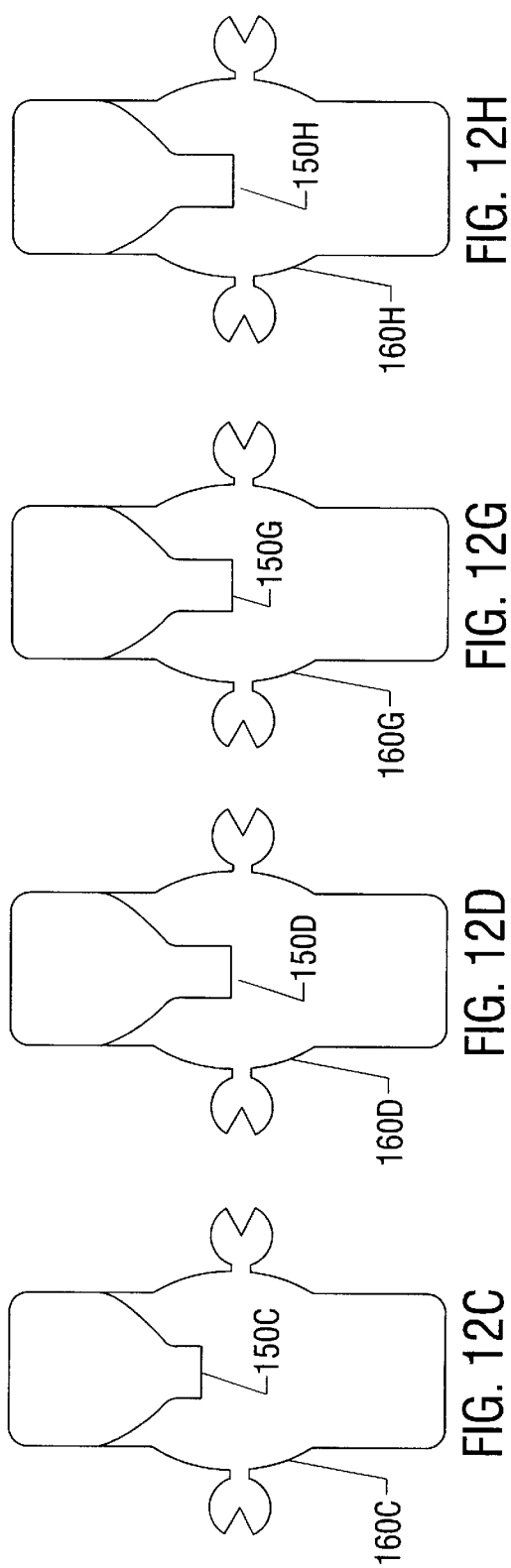

METHOD AND APPARATUS FOR JOINING METALS

BACKGROUND OF THE INVENTION

The present invention relates to the joining of two workpieces by a welding apparatus and technique. More specifically, the present invention relates to joining two workpieces via homopolar generator welding.

Homopolar pulse welding (HPW) utilizes a high current, low voltage pulse produced by a homopolar generator to rapidly resistance heat an interface between two components to forging temperature. In typical HPW methods, flat ends of two workpieces are carefully aligned and held under a light initial load to focus heat generation at the interface. As the current pulse is discharged through the workpieces, the intense heat generated at this interface diffuses axially, softening the adjacent material. After a preset delay, an upset force is then applied to produce a forge weld at the interface. Only a few seconds are required from initiation of the pulse to completion of the weld. HPW may be used to rapidly join lengths of pipe in pipeline construction. It is particularly desirable for application in deep water offshore pipeline construction systems. HPW may also be used in joining rails in railroad construction. HPW may also be applicable for brazing, compaction, or forging.

The homopolar generator used in HPW methods is based on the principle that a conductor moving normal to a magnetic field generates an electric potential difference between the conductor ends. In one such type of generator, the conductor is a disk or rotor rotating normal to the direction of a magnetic field generated by field coils surrounding the disk. A potential difference is generated between the rotor outside diameter and the rotor shaft. Sliding contacts on the shaft and rotor serve as current collection devices. A "disk-type" or "drum-type" generator may be used in connection with the present invention.

FIG. 1 shows an exemplary embodiment of a "disk-type" homopolar generator 10 that may be used in connection with the present invention. Further details of homopolar generators are disclosed in U.S. Pat. No. 4,544,874, the disclosure of which is incorporated herein by reference.

Other solid state, forge welding methods differ from HPW in the nature of the energy source, joint preparation, and heating rates used to distribute heat to adjacent material. Such welding techniques include friction welding, flash butt welding, and shielded active gas (SAG) forge welding.

For most electric resistance welding processes, welding heat primarily is generated at the interfaces and diffuses to adjacent material. Except for high frequency resistance welding techniques, intense interface heating results from contact resistance to the welding current flow. High frequency resistance welding and SAG forge welding use a high frequency current, flowing through the joint surface between the electrodes, to generate interface heat. Skin depth effects, controlled by the frequency of the alternating current, constrain heating to the near-surface material.

Assorted current sources, including alternating and direct current types and stored energy machines using capacitor banks, provide the energy for other resistance welding methods. Except for capacitor discharge welding techniques, which have significantly more rapid heating rates than other techniques, heating rates for other resistance welding techniques are considerably slower than for homopolar welding. Friction and inertia welding use frictional heating from the relative motion between workpieces to introduce heat to workpieces. Intense heat generated at the interface diffuses to the adjacent material, heating it to its forging temperature.

SUMMARY OF THE INVENTION

The present invention in a broad aspect comprises a system for preparing opposing ends of two workpieces for joining by forming a step and bevel geometry on the opposing ends, contacting the formed ends under a forging load, and resistively heating the contacted ends under the forging load by discharging sufficient energy into the contacted ends. The system may also include applying and maintaining a substantially constant forging load between the workpieces during the joining process, and restricting the workpieces from transverse movement. By using this system, the joined workpiece creates a fin that may be removed.

In exemplary embodiments, the workpieces may comprise HSLA steels. The substantially constant force may be applied by a hydraulic cylinder, and the sufficient energy is preferably delivered by a homopolar generator.

The present invention in another broad aspect comprises a method for joining two workpieces having joining ends by contacting the joining ends to form a weld interface, mounting electrodes on each of the workpieces, applying and maintaining a substantially high force at a forging level of the workpieces, and resistively pulse heating the weld interface by discharging sufficient electrical energy through the electrodes to form a joined workpiece. This method may also include creating a step and bevel geometry on the joining ends of the workpieces.

The present invention also resides in an apparatus for joining two workpieces, comprising a current source to provide a low voltage, pulsed DC current to resistively heat the workpieces, electrodes electrically connected between the current source and the workpieces, a welding fixture to support the workpieces, and a loading device, which may be controlled by a load controller, to apply a constantly high load at a forging level to the workpiece.

The apparatus in one exemplary embodiment comprises a restricting means for limiting transverse movement of the workpieces during application of the current. The apparatus may further include a switch and busswork electrically connected between said current source and said electrodes. In an exemplary embodiment, the current source comprises a homopolar generator. The welding fixture may comprise a first platen and a second platen, with the workpieces clamped between the first platen and the second platen. Further, the joining ends may have a step and bevel geometry. In exemplary embodiments, the workpieces may be piping or rail.

The present invention addresses the problems of the prior art by developing specific joint preparations of workpieces to be joined, which reduce the areas of contact between the workpieces. Additionally, the present invention provides a constantly high load to the workpieces during application of the resistance heating to permit joining of the workpieces.

Localized heat is generated at and in the vicinity of the interface of two workpieces 20 from two separate phenomena: (1) interface heating resulting from incomplete contact at the mating surfaces or interface 22, which reduces the real area of contact to a multitude of disperse contact spots or asperities 24, thereby increasing the current path length and the current density 26 in the asperities 24, as shown in FIG. 2; and (2) increased current density 26 in the material adjacent to the interface resulting from the specific joint preparation 28, as shown in FIG. 3. With increasing temperature, the softened material displaces parallel to the interface 22 as the flow stress of the material is exceeded under the applied load. The workpiece shortens as the softened material is expelled. As the current discharges through the welding circuit, a metallurgical bond forms between the workpieces 20 and a smooth weld bulge 30 forms with an easily removable extension, fin 35, as shown in cross-section in FIG. 4. The weld bulge 30 is free from notches or other stress raisers. Another benefit of the present invention is that impurities in the interface material are expelled into fin 35, and any inherent notches or stress raisers are discarded with the fin.

In an exemplary embodiment, a low voltage, high amperage direct current pulse capable of delivering peak current densities of approximately 50 kA/in.$^2$ to 100 kA/in.$^2$, and more preferably between 70 and 80 kA/in.$^2$ for welding of steel workpieces, may be applied to the workpieces to be joined. This current source may be applied in a time duration of approximately 1 second to 10 seconds, and more preferably about 3 seconds to about 7 seconds.

In an exemplary embodiment, the current source may be a homopolar generator. FIG. 5 is a block diagram of a HPW discharge circuit showing circuit resistances. In FIG. 5, homopolar generator 10 having an internal resistance 12 is connected via switch 56 through a circuit resistance 52 and electrode resistance 54 to a pair of workpieces 20 to be joined at an interface 22, represented by bulk resistance 21 and interface resistance 23.

Other means of delivering the current densities required may be used. These means include capacitor banks and line voltage. However, capacitor banks deliver the energy in an amount of time on the order of microseconds, whereas the homopolar generator takes seconds to discharge its energy. For a given generator, variables relevant to weld properties include preset discharge speed and the magnitude of the field current. Discharge speed determines energy availability and field current controls the current pulse shape.

The present invention preferably includes a joint preparation comprising a step and bevel geometry of a shaped end 60 of a workpiece 20, an example of which is shown in FIG. 6. As used herein the terms "step and bevel" or "end geometry" are not limited to that shown in FIG. 6, but may also include any shape or geometry having a narrowing width at the interface 22, and a broadening width away from the interface 22 of the workpiece. The step and bevel preparations of the present invention are preferably centrally or symmetrically disposed relative to their respective workpieces. It may be desired, however, in a particular embodiment to prepare an eccentric positioning of a step and bevel preparation.

The geometry of this joint preparation is used to control heat generation in and adjacent to the shaped end 60 and to expel the original interface surface. Changing the end geometry parameters shown in FIG. 6, such as step length 62, step width 64, bevel angle 66, and shoulder radius 68, for example, directly affects the local heating rates in the shaped end 60 and its resulting mechanical response under the applied load.

Selection of a particular combination of end geometry parameters, in combination with other features of the present invention, may be used to provide a contaminant-free metallurgical bond across the entire workpiece area.

In other welding methods, only projection welding, flash butt welding and shielded active gas forge welding use a shaped end. The shaped end in projection welds is designed to focus the heat generation and resulting deformation in the projection. Projection weld joint design uses "beveling" only and joins workpieces at discrete points rather than continuously over the entire workpiece area. Flash butt welding joint design uses "beveling" only to control arcing and to balance the heating between workpieces.

In known HPW systems, no such end geometries or constant loading conditions are used. Instead, most HPW systems and methods comprise placing flat ends of two workpieces together so that they are carefully aligned in the axial direction. In known HPW systems, the workpieces are then held under a light initial load to focus heat generation at the interface between the two workpieces. As the current pulse discharges through the workpieces from the HPG, intense heat is generated at the interface. This heat diffuses axially, thereby softening the adjacent material. After a preset delay, an upset load is applied and maintained for a preset time. This load forges the softened material to form the metallurgical bond. The delay controls the extent of softening, and the duration of the upset load controls the extent of deformation. The process requires thermal diffusion and pulsed loading for success. Illustrations of this known process are shown in FIGS. 7 and 8, and are discussed further below.

Other features of the present invention that lead to such a contaminant-free metallurgical bond include applied load parameters and generator parameters, as will be discussed below. As discussed herein, the present invention uses a high constant load that is applied to the workpieces to be joined. The constantly high load is applied at a forging level of the workpieces to be joined. This load will vary depending on the size and material of the workpieces. In other words, the constantly high load is applied as an upsetting force throughout the entire welding cycle. Combinations of selections of these parameters permit controlling the finished weld profile so that the bond may be characterized by a smooth weld bulge extending from the surface of the workpiece, and a thinner fin extending from the weld bulge. The weld bulge is preferably free from notches or other stress raisers, and in an exemplary embodiment, the fin contains much of the original interface material.

The present invention is a marked improvement over prior art techniques, as the present invention reduces dependence on interface heating, and controls deformation by the end geometry of the workpieces to be joined, and minimizes the reliance on thermal diffusion, and simplifies load requirements. The reduced contact area and the high is constant load thus reduce contact resistance and interface heating. Using the geometry of the present invention with the high constant load has several benefits. During weld setup, the interface alignment is more tolerant to assorted misalignments, and acceptable surface finishes may range from approximately 30 µm RMS to approximately 700 µm RMS. During discharge, the characteristic discharge deformation of the interface material limits the peak temperatures and time at temperature, which therefore permits improved mechanical properties.

Additionally, with prior methods, the interface experienced extremely high temperatures (estimated to be upwards of 50,0000° F.), with resulting incipient melting of the high carbon/alloy material near the point of contact. This caused metallurgical discontinuities, producing poor mechanical properties in finished welds using prior methods. A lower peak temperature at the interface and a shallower heating gradient from interface to the parent metal assures a more coherent microstructure and better, more consistent mechanical properties in the finished weld of the present invention.

The primary control of heat generation in the workpiece 20 of the present invention is control of the shape of the joint between the two workpieces 20. The step and bevel joint preparation creates an axial cross-sectional area distribution that affects the local heating and the local stress magnitude. The reduced area increases the heating rates and produces an axial temperature gradient. The temperature gradient and the stress gradient coincide, resulting in rapid softening of the step to its flow stress. The softened step, containing the interface, rapidly displaces parallel to the interface and forms a fin 35. As current continues to discharge through the deforming joints, the bevel and radii soften and forge according to their cross-sectional area to form the weld bulge. Material yields as it softens to its flow stress, as shown in FIGS. 9 and 10, discussed further below.

The shaped end geometry of the present invention provides sufficient heat for welding without using the interface heat, as demonstrated by performing simulated welds. (It is to be noted that simulated welds use typical weld generators and fixture parameters; however, in simulated welds, a solid pipe replaces the pair of pipes. The solid pipe is machined to produce the equivalent cross-section of the pair of butted pipes.) The geometry of the present invention also permits current to pass through the shaped end to generate an in-place temperature gradient without primary reliance on thermal diffusion.

In prior known HPW systems and methods, a light initial load was applied, followed by an upset load, as shown in FIG. 8. As shown in FIG. 8, a total current of approximately 215 kA was discharged into the system. An interface voltage of less than approximately 1 volt arose in the workpieces 20 to be joined. A light initial load of approximately 10 kip was applied to the workpieces 20. After approximately 1 to 4 seconds, an upset force of approximately 60 kip was applied for a brief period (i.e., 0.5 to 2 seconds), thereby causing displacement and joining of the two workpieces 20.

The present invention provides a constantly high load during the weld process, as shown in FIGS. 9 and 10. As shown in FIG. 10, a total current of approximately 216 kA is discharged into the system. An interface voltage of less than approximately 1 volt arises in the workpieces 20 to be joined. A substantially constant force of approximately 60 kip is applied to workpieces 20 throughout the joining process, thereby causing displacement and joining of the two workpieces 20. It is desired that the applied load remain substantially constant as the joint forges, thereby shortening the workpieces 20. Use of a constant load by the present invention simplifies the load control requirements. The higher load at initiation reduces resistance at the interface by increasing real contact area. Further benefits from constant loading of a high level include reduced interface resistance and lower peak temperature, improved metallurgy, and reduced time at temperature.

Thus, the present invention as applied to the pipe discussed below in TABLE 1 uses a load that is approximately 50 kip higher than the prior art upon initialization. As welding occurs, the prior art applied an upset load of approximately 60 kip, which occurred for approximately 0.5 to 2 seconds. The present invention thus constantly provides a much higher and constant load than that used in the prior art.

The present invention thus combines a homopolar generator power source with constant loading and step and bevel geometry. This combination controls the heating and subsequent mechanical response of the workpiece, and provides a mechanism to expel the interface. It is envisioned that the present invention is also capable of joining extended surfaces, such as cylinders and bars.

Further benefits of the present invention include the following advances. Lower homopolar generator discharge speed reduces system requirements. Reduced sensitivity to interface conditions, such as surface finish and waviness, create an improved weld profile with an easily removable fin. Because the time that the system operates at an elevated temperature is reduced, weld metallurgy is also improved. The metallurgy is also improved because dynamic recrystallization occurs after deformation commences when the material heats to flow stress, thereby increasing grain refinement in the weld microstructure. The present invention also provides improved impact toughness for certain high strength materials, such as QT (quenched and tempered) and CR (control rolled), without post-weld heat treatment. The geometry of the present invention also provides for reduction in heat-affected-zone (HAZ) softening and width.

Exemplary ranges of welding parameters producing acceptable welds are shown in TABLE 1 below. It is to be understood that certain parameters may be greater or less than those shown in TABLE 1 and still fall within the scope of this invention. The values shown in TABLE 1 are for an exemplary welding process using nominal 3 inch Sch-80 API line pipe. Any size pipe will be welded in a similar manner, after adjusting these parameters to accommodate size and material differences.

TABLE 1

Range of Weld Parameters Producing Acceptable Welds For Nominal 3 Inch Sch-80 API Line Pipe

| Parameter | Unit | Low Setting | High Setting |
| --- | --- | --- | --- |
| Discharge Speed | rpm | 2000 | 2200 |
| Field Current | A | 300 | 400 |
| Applied Load | kip | 45 | 60 |
| Step Length | in. | 0.05 | 0.10 |
| Step Width | in. | 0.10 | 0.15 |
| Bevel Angle | degree | 30 | 45 |
| Shoulder Radius | in. | 0 | 0.15 |

These ranges are within normal machining tolerances and existing HPW control system capabilities. Welds with acceptable mechanical properties, especially near parent metal impact toughness values have been made in high strength low alloy (HSLA) steels having carbon contents from approximately 0.08% to 0.13% by weight, and $IIW_{EQ}$ carbon equivalencies from approximately 0.23 to 0.33%.

Examples of particular welding applications contemplated for the invention include butt joining of plates, landing gear joining, joining of jet turbine components, joining of tubing, and railroad rail joining. An application of particular interest is in joining of line pipe, especially where single station welding operation is required, as in J-lay systems.

Exemplary materials that may be used in connection with the present invention include, for example, Inconel™, stainless steels, and titanium and its alloys.

BRIEF DESCRIPTION OF THE DRAWINGS

FIGS. 12A–12H are cross-sectional representations of exemplary welds according to the present invention.

DESCRIPTION OF ILLUSTRATIVE EMBODIMENTS

Figure 11:
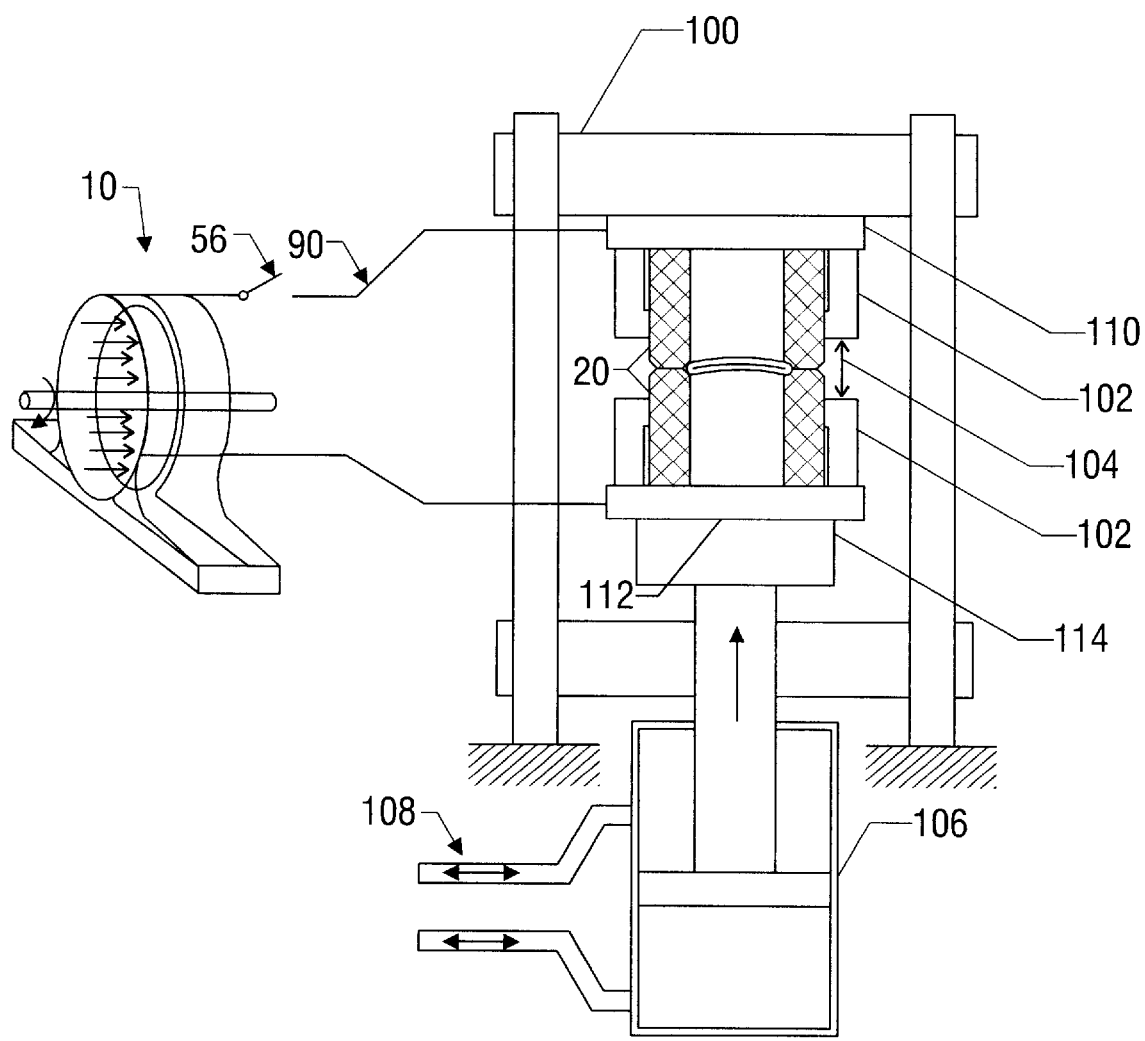
FIG. 11 is a schematic of a homopolar generator welding system according to the present invention.

FIG. 11 shows an apparatus constructed according to the present invention. FIG. 11 includes a homopolar generator 10 connected via switches 56 and busswork 90 to electrodes 102, which are attached to workpieces 20. The workpieces in this instance are two sections of pipe. The hydraulic welding fixture 100 includes upper platen 110 and lower platen 112 to hold workpieces 20 in axial alignment during the welding operation. Below lower platen 112 is a load sensing device 114, which measures a load force from a hydraulic cylinder 106. Power to the hydraulic cylinder 106 is supplied from hydraulic lines 108.

An exemplary method according to the present invention for welding 3" steel pipe is with a nominal cross-section of 3" will be discussed. It is to be noted that the choice of weld parameters, discharge speed, field current, etc., is determined by the specific material to be welded, including cross-sectional area and material type. For steels, peak current densities between approximately 70 to 80 kA/in.$^2$ produce acceptable welds.

In operation, a homopolar generator 10 is accelerated until it reaches a speed of between approximately 1700 rpm and 2500 rpm, and more preferably between about 2000 rpm and 2200 rpm. It is to be noted that the speed for a given machine depends upon the current requirement. At the time the homopolar generator 10 reaches the desired speed, the homopolar generator 10 is discharged and current is delivered through busswork 90 to the electrodes 102. The busswork 90 may be comprised of copper or aluminum, and is used to provide the desired current to workpieces 20 with minimal loss. The homopolar generator 10 is discharged via switches 56 into the busswork 90. In an exemplary embodiment the switches may be made of silicon-carbon. However, any switch capable of handling the large current may be used. Alternately, the circuit may be completed simply by dropping the brushes of the homopolar generator 10.

The electrodes 102 are connected to workpieces 20 and, in an exemplary embodiment may be made of copper or copper alloy. In other embodiments, electrodes 102 may be made of other conductive material, such as aluminum. The electrodes 102 enable current to be introduced into workpieces 20 without burning, arcing, or overheating the workpieces 20. The electrodes 102 also act as a heat sink during cooling, after welding has occurred. In an exemplary embodiment, the electrodes 102 may be shaped so as to surround the workpieces 20 to which they are attached.

In an exemplary embodiment, electrodes 102 may be configured as sleeves of contact fingers connected to a platen, serving as a base. Each sleeve may have slots cut so that the sleeve becomes a concentric ring of fingers. The ends of the fingers may be fastened to workpieces 20 via jackscrews mounted in a collar or a hydraulic cylinder may be used to push the fingers together. Also in an exemplary embodiment, the electrodes 102 may be placed such that they contact portions of the workpieces 20 near the joining is ends. The electrode gap 104 between electrodes 20 is shown in FIG. 11. In an exemplary embodiment, the electrode gap 104 may be between about 0.5 inch and 4 inches, and more preferably between about 1 inch and 2 inches.

Platens 110 and 112 may be comprised of any conductive material such as copper or copper alloy. In addition to the platens 110 and 112, restricting means (not shown in FIG. 11) may be provided to prevent transverse movement of the workpieces 20 during welding. In an exemplary embodiment, the restricting means may be linear bearings or radial clamps. Other means such as an internal mandrel may also be used. The restricting means acts to limit transverse movement of the workpieces 20 as the interface between workpieces 20 buckles under the applied load force.

The load force is applied via hydraulic cylinder 106 to a load sensing device 114, which transmits the force to workpieces 20. In addition to hydraulic cylinder 106, other load devices such as lead screws or linear springs may be used. The constantly high load force is applied from a time prior to discharge of the homopolar generator 10 until a time the workpieces 20 have been joined. For the 3" pipe discussed, the load force applied may be between approximately 10 kip and 90 kip, and more preferably between about 45 kip and 60 kip. In an exemplary embodiment, the load force is substantially constant through the resistive heating and welding processes.

Figure 10:
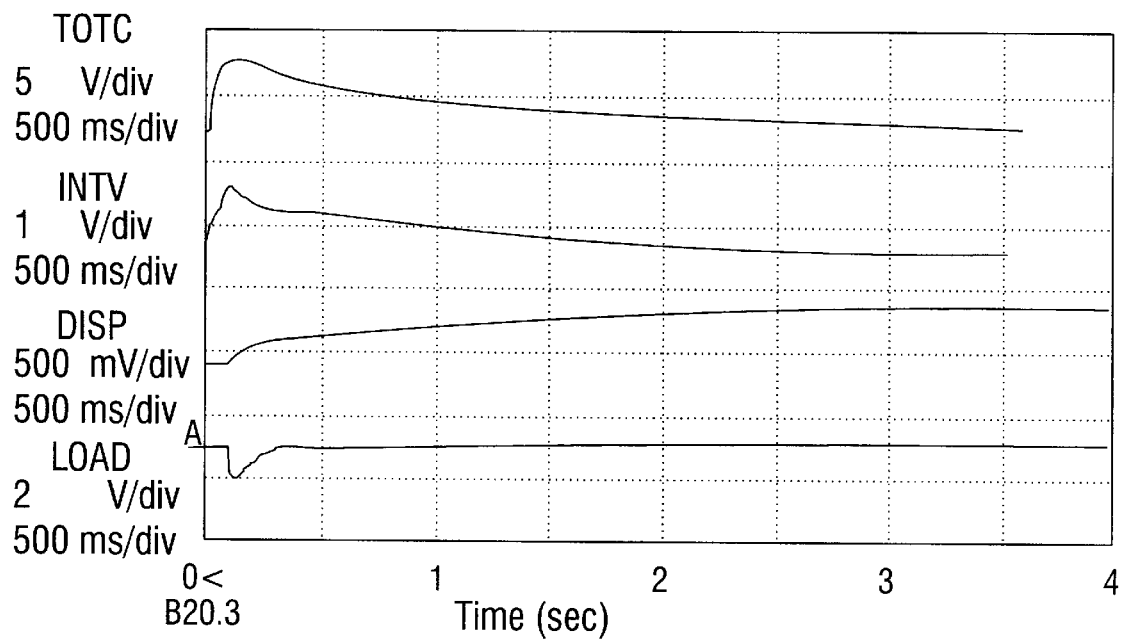
FIG. 10 shows process traces from an exemplary weld according to the present invention.

Although desired to be substantially constant, the present invention contemplates that the applied load force may vary somewhat from a constant force. As shown in FIG. 10 for example, during initial application of the load force, a slight drop in force is seen approximately 0.2 second after application. This drop in force is caused by rapid softening and subsequent shortening of the workpieces that exceeds the displacement rate of the hydraulic system. However this drop does not affect the quality of the weld achieved.

In operation, the homopolar generator 10 is accelerated to a rotational speed above the discharge speed via hydraulic motors, for example. Motoring is discontinued at this point and the rotor begins decelerating. In sequence, the field coils are energized, producing a uniform magnetic field across the rotor, and the brushes are lowered, further slowing the rotor. When the rotor speed decelerates to the set point, switches close, discharging the stored rotational kinetic of the rotor, as it is converted to a DC electrical pulse. The low voltage, large magnitude DC current pulse tracks through the electrodes 102 and into workpieces 20, providing both bulk heating and interface heating. Throughout this time, a constant load is applied to first platen 110 and second platen 112 to complete the weld.

The workpieces 20 may be comprised of various metals, such as a nickel super alloy (Inconel™), titanium, and stainless steel. In exemplary embodiments, the wall thickness of pipe workpieces 20 may be between approximately 0.2 inch and 0.6 inch, and more preferably between 0.3 inches and 0.45 inch. However, the present invention may be used on workpieces having larger or small wall thickness than these. It is noted that the values discussed herein are listed in connection with welding of pipe having a wall thickness of 0.3 inches.

The end geometry of the joining ends of the workpieces 20 creates contact between the two workpieces 20 to be joined. The workpieces 20 may be prepared with the desired end geometry by various methods. For example, the workpieces 20 may be lathed, machined, or otherwise prepared, such as with a pipe-shaping machine. As stated previously, the abutting ends of the workpieces are beveled to a reduced size.

Figure 1:
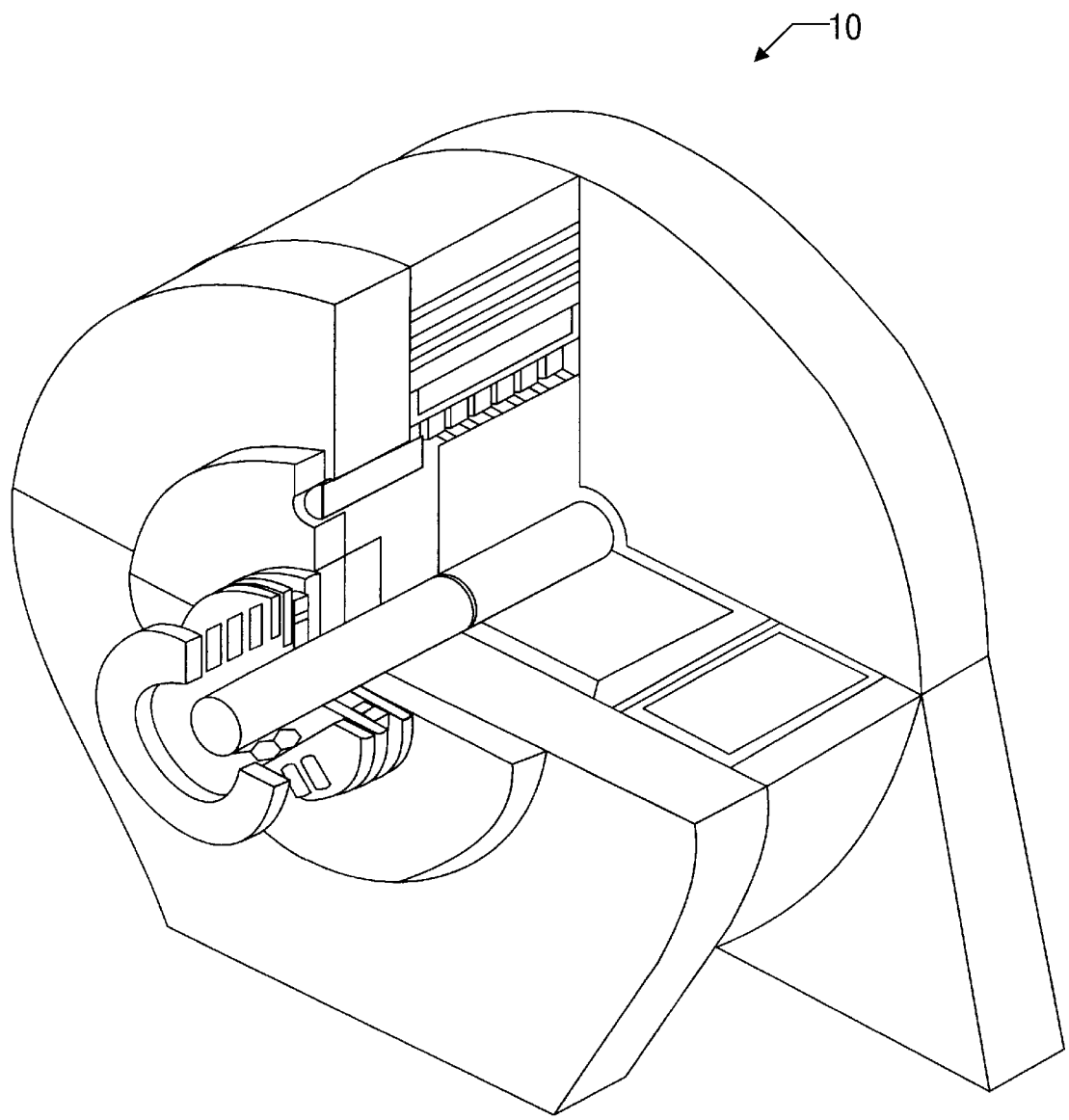
FIG. 1 shows a cutaway view of a homopolar generator as used in the present invention.
Figure 2:
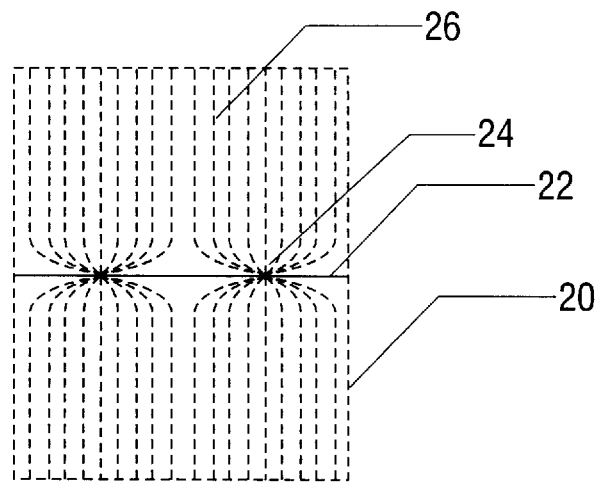
FIG. 2 shows current flow through asperities at an interface between workpieces to be joined according to the present invention.
Figure 3:
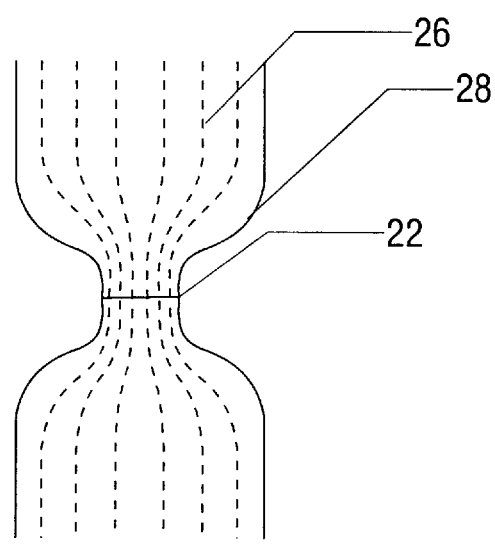
FIG. 3 shows current flow constriction near an interface between two workpieces to be joined according to the present invention.
Figure 4:
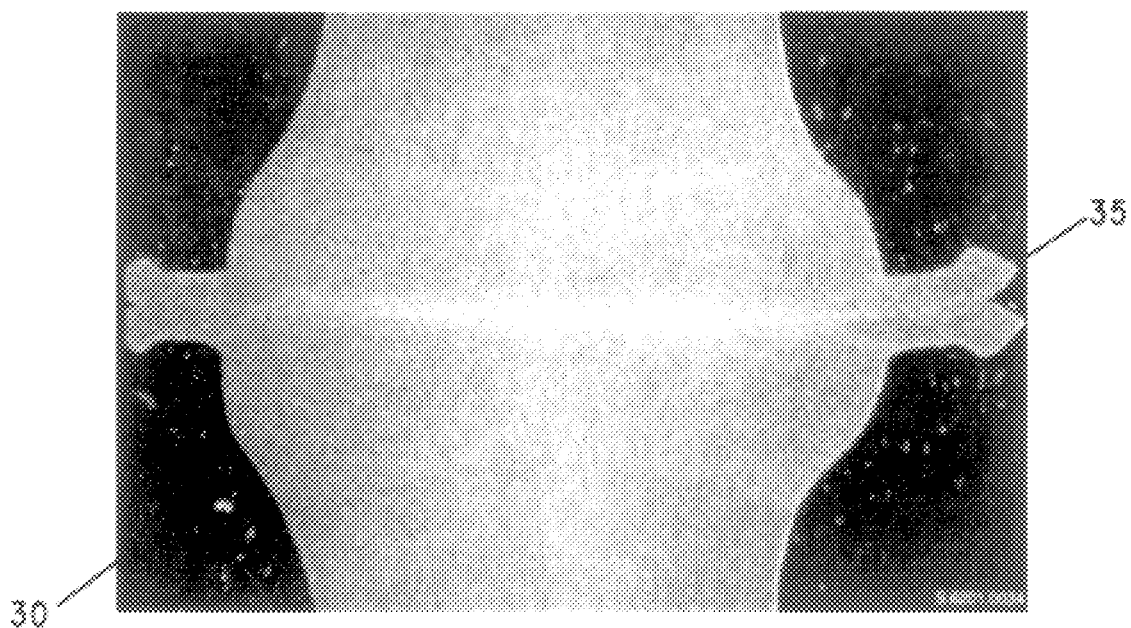
FIG. 4 is a cross-sectional view of a weld performed according to the present invention.
Figure 5:
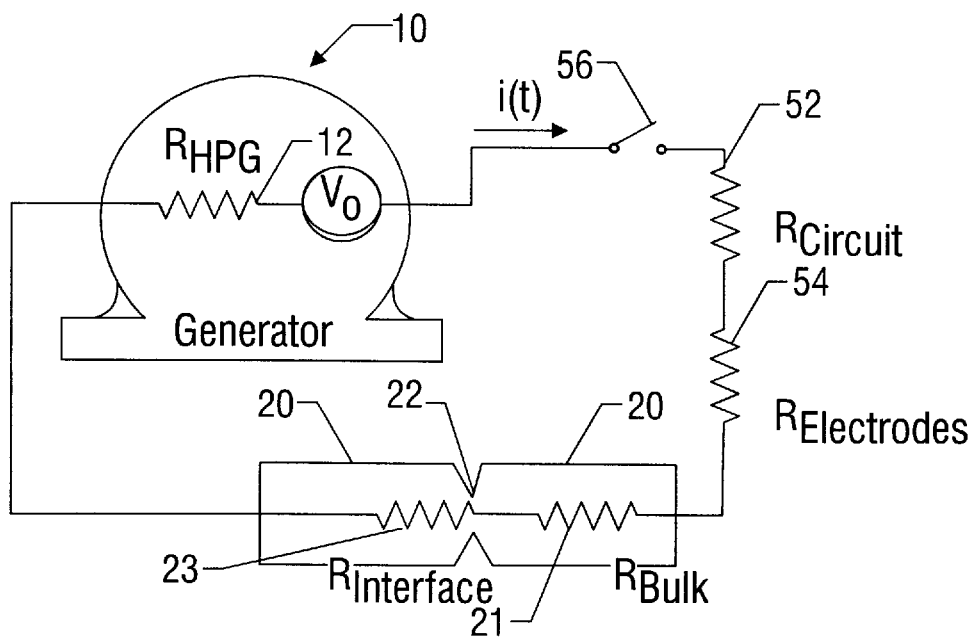
FIG. 5 is a circuit diagram of a homopolar generator welding discharge circuit showing circuit resistances.
Figure 6:
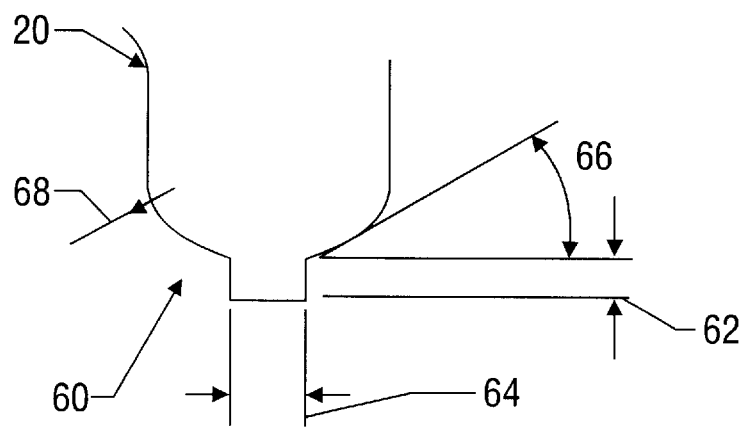
FIG. 6 shows a cross-sectional view of a workpiece prepared according to the present invention.
Figure 7:
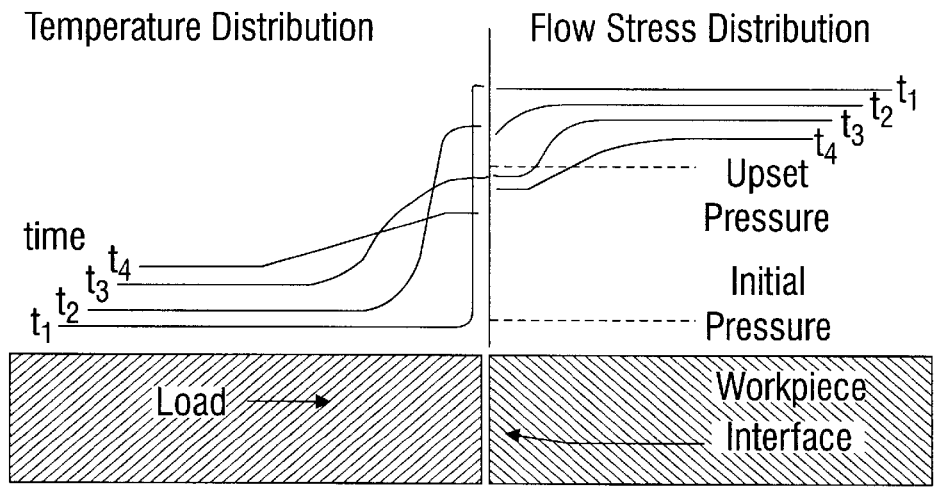
FIG. 7 is a schematic of temperature and flow stress distribution in flat-end, pulsed-loaded HPW, as practiced in the prior art.
Figure 8:
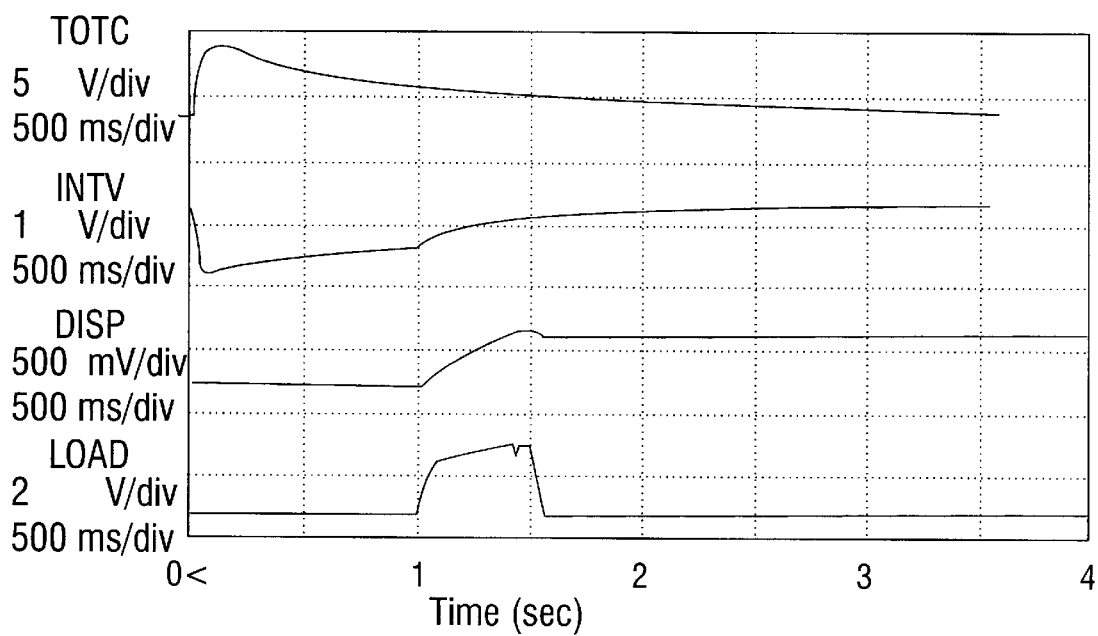
FIG. 8 shows process traces from an exemplary prior art, flat-end, pulsed-loaded HPW.
Figure 9:
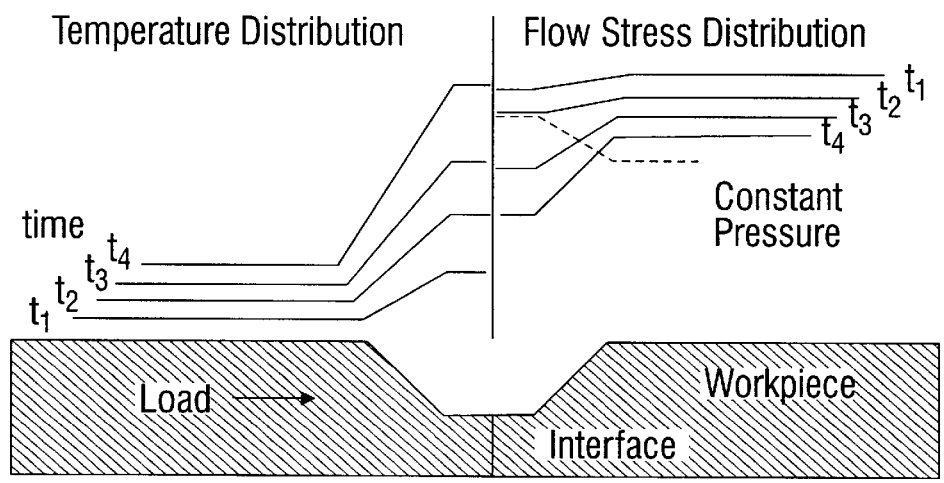
FIG. 9 is a schematic of temperature and flow stress distribution from an exemplary weld according to the present invention.

As shown in FIG. 6, parameters of the step and bevel geometry include contact point or step width 64, step length 62, bevel angle 66, and shoulder radius 68. In an exemplary embodiment, the step width 64 may be between approximately 0.1 inch and 0.3 inch, and more preferably between about 0.10 inch and 0.15 inch. The bevel angle 66 may be between approximately 25 degrees and 75 degrees and more preferably between about 30 degrees and 45 degrees. The step length 62 may be between approximately 0.01 inch and 0.2 inch, and more preferably between about 0.05 inch and 0.10 inch.

In an exemplary embodiment, the workpieces may be further prepared prior to the welding. For example, workpieces 20 may have their joining ends finished by sandblasting, wire brushing, or grinding. The purpose of finishing the workpieces is to provide smooth joining surfaces for improved weld quality and provide suitable contact for electrodes 102.

Examples of welds performed by the methods of the present invention are shown in FIGS. 12A–12H. As seen in FIGS. 12A–12H, these welds have different shapes and qualities, as a result of different combinations of parameters used in making the welds. FIGS. 12A–12H show the initial cross-section of one of the workpieces to be joined, as 150A–150H, respectively, superimposed on the finished cross-section of the joined workpieces as 160A–160H, respectively. FIGS. 12A–12D show the results of welds in which the step length 62 is fixed at a short length of approximately 0.05 inch. FIGS. 12E–12G show the results of welds having a longer step length 62, of approximately 0.10 inch, thereby resulting in a longer fin 35.

FIGS. 12A, 12C, 12E, and 12G show the results of a narrow step width 64, approximately 0.10 inch, whereas FIGS. 12B, 12D, 12F, and 12H show the results of a wide step width 64, approximately 0.15 inch. FIGS. 12A, 12B, 12E, and 12F show the result of a bevel angle 66 of approximately 30°, and FIGS. 12C, 12D, 12G, and 12H show the result of a bevel angle 66 of approximately 45°.

Further modification and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having benefit of this description of the invention.

What is claimed is:

1. A method for joining opposing ends of two workpieces to form a joined workpiece using pulsed welding to create a full section weld, comprising:

forming a step and bevel geometry on each said opposing end, said step and bevel geometry for controlling heat generation;

contacting the resulting formed ends under a forging load; and resistively heating the contacted ends to a forging temperature under said forging load by discharging sufficient energy into said contacted ends to form said joined workpiece having said fall section weld.

2. The method of claim 1, wherein said forging load is substantially constant.

3. The method of claim 2, further comprising restricting said workpieces from transverse movement.

4. The method of claim 2, which further comprises controlling said forging load and said resistively heating to form a fin projecting from said joined workpiece.

5. The method of claim 2, wherein said workpieces comprises HSLA steels.

6. The method of claim 2, which further comprises hydraulically loading said workpieces to develop said forging load.

7. The method of claim 2, wherein said sufficient energy is delivered by a homopolar generator operating in pulsed mode.

8. A method for joining opposing ends of two workpieces, each of said opposing ends having an extended interface, comprising:

creating a step and bevel geometry on said opposing ends to control heat generation;

contacting said opposing ends to form a weld interface;

mounting electrodes on each of said two workpieces;

applying and maintaining a constantly high load at a forging level of said opposing ends to said two workpieces; and resistively pulse heating said weld interface by discharging sufficient electrical energy through said electrodes to form a joined workpiece.

9. The method of claim 8, wherein said sufficient electrical energy is discharged within five seconds.

10. A method for joining a first workpiece and a second workpiece using a homopolar generator, comprising:

creating a step and bevel geometry on opposing ends of said first and second workpieces;

placing said first and second workpieces in a welding fixture to support said first and second workpieces and to thereby contact said opposing ends;

applying a constantly high load at a forging level to said first workpiece and said second workpiece; and using said homopolar generator to provide a low voltage, pulsed DC current to resistively heat said first and second workpieces to thereby join said first and second workpieces.

11. The method of claim 10, wherein said low voltage, pulsed DC current comprises a peak current density between about 50 kA/in.$^2$ to about 100 kA/in.$^2$.

12. The method of claim 10, wherein said low voltage, pulsed DC is provided in a time frame between about 1 second and about 10 seconds.

13. The method of claim 10, wherein said step and bevel geometry is similarly disposed relative to said first and second workpieces.

14. The method of claim 10, wherein said step and bevel geometry comprises a bevel angle of between about 25° and 75°.

* * * * *

UNITED STATES PATENT AND TRADEMARK OFFICE
CERTIFICATE OF CORRECTION

PATENT NO. : 5,880,425
DATED : March 9, 1999
INVENTOR(S) : Carnes, Jr. et al.

It is certified that error appears in the above-identified patent and that said Letters Patent is hereby corrected as shown below:

On the title page, item [75], line 1, after "Jr.," insert -- Austin, Tex. --.

On the title page, item [75], line 2, after "Haase", insert -- Sugarland, Tex. --.

On the title page, item [75], line 3, delete "all of Austin, Tex.", and insert the following therefor: -- both of Austin, Tex. --.

In claim 1, column 10, line 18, delete "fall", and insert the following therefor: -- full --.

Signed and Sealed this

Thirteenth Day of July, 1999

Attest:

Q. TODD DICKINSON

*Attesting Officer*            *Acting Commissioner of Patents and Trademarks*